June 25, 1963
R. W. HESS
3,094,747
SPLICED STRUCTURAL PRODUCTS AND METHOD OF SPLICING
Filed June 23, 1960
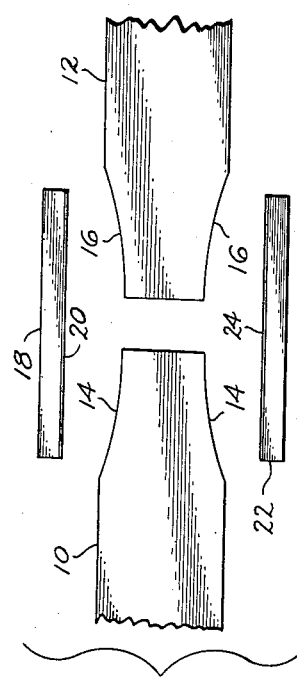
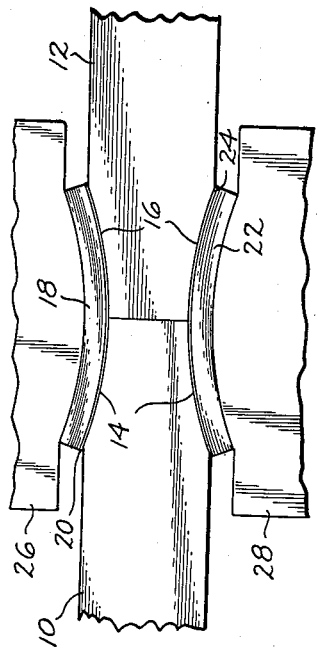
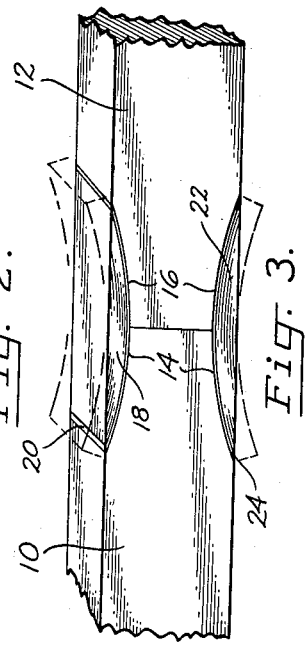
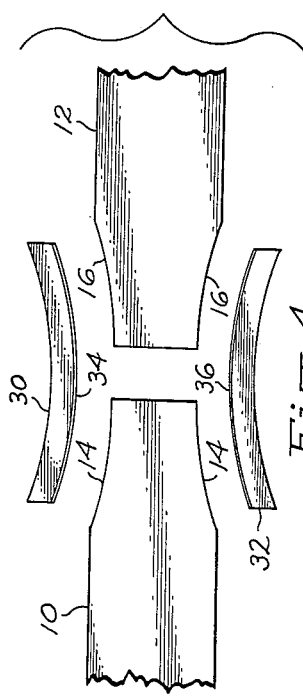
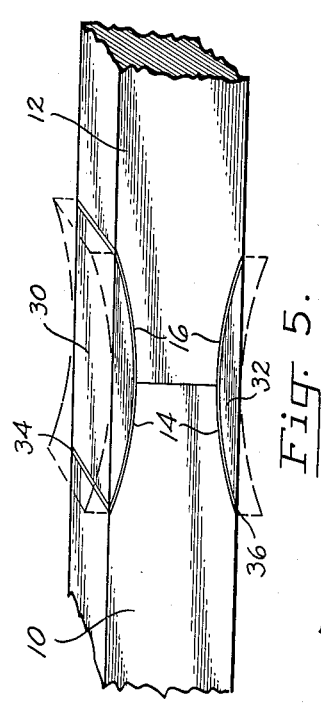
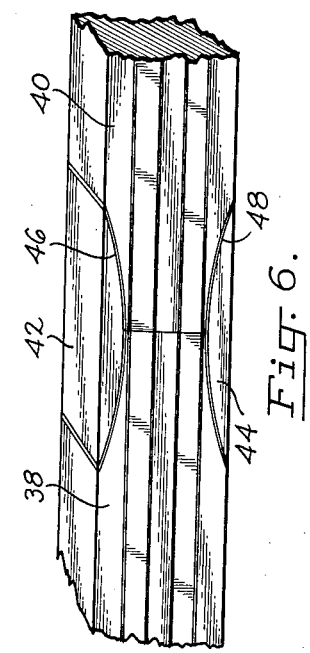
Robert W. Hess
INVENTOR.
BY
Atty.

United States Patent Office 3,094,747
Patented June 25, 1963

3,094,747
SPLICED STRUCTURAL PRODUCTS AND
METHOD OF SPLICING
Robert W. Hess, Portland, Oreg., assignor to Georgia-Pacific Corporation, Portland, Oreg., a corporation of Georgia
Filed June 23, 1960, Ser. No. 38,374
5 Claims. (Cl. 20—92)

This invention relates to spliced structural products and to a method of making the same. It relates particularly to products made by splicing together, end to end, pieces of lumber and plywood, and to a method of making such products.

As is well known, plywood and lumber normally are manufactured in pieces of limited length. When longer pieces are required, it has been usual practice to join shorter pieces end to end by means of conventional scarf joints.

To develop the maximum mechanical strength of the wood in such a joint, it is necessary to use a joint slope of 15:1 or greater. Beveling the ends of the pieces to attain such a slope obviously wastes an amount of wood equal to the width of the splice. Hence a slope of but 8 or 10 to 1 commonly is used, sacrificing strength to reduce material waste.

It is the general object of the present invention to provide joined structural products, particularly joined wood products, which are connected to each other through joints which are at least as strong as scarf joints, but which do not require sacrificing any portion of the length of the joined pieces.

Other important objects of the present invention are the provision of a method of joining structural members, particularly plywood and lumber pieces, which is simple, rapidly effectuated with readily obtainable equipment, and without the necessity of precisely matching cut surfaces such as the beveled surfaces used in making scarf joints.

The manner in which the foregoing and other objects of this invention are accomplished will be apparent from the accompanying specification and claims considered together with the drawings wherein:

FIG. 1 is an exploded view illustrating the components of the herein described structural products in their relationship to each other prior to assembly;

FIG. 2 is a side elevation, similar to FIG. 1, but with the pieces assembled and in the act of being pressed together;

FIG. 3 is a fragmentary perspective view of the spliced product;

FIGS. 4 and 5 are fragmentary exploded and perspective views, corresponding to FIGS. 1 and 3, respectively, but illustrating the application of a special category of splice pieces to the manufacture of the herein described structural products; and FIG. 6 is a fragmentary perspective view illustrating the application of the invention to the manufacture of spliced plywood products.

The present invention is predicated on the concept that when structural members are bent, significant stresses normally occur in the surface layers only. Compression stress is set up on the concave side of the bent member and tension stress occurs on the convex surface. It is these stresses, primarily that of tension, which the scarf and other joints must resist.

Such resistance is developed to increased degree in the scarf joint as the joint slope becomes longer and, where the structural members joined are of wood, more of the wood fibers are glued together side to side rather than end to end.

In the present invention, maximum joint strength is attained by developing a long joint slope in the face layers of the joined elements, where the severe tension stresses occur, but without sacrificing any of the length of the joined pieces.

This is accomplished by providing a pair of edge-abutting, substantially coplanar structural members having substantially registering recesses in their adjacent margins on at least one side. A splice piece is seated in the recesses, overlapping the margins, and adherently united thereto. Where the structural members are of wood, the grain of the splice piece is substantially aligned with that of the structural members so that the wood fibers are glued side to side. Maximum bending strength accordingly is developed, but no wood is wasted.

Considering the foregoing in greater detail and with particular reference to the drawings:

Although this invention has great utility in joining together pieces of plywood and lumber end to end to form long structural units, it also has application when other structural materials are used. Such materials include gypsum board, insulation board, particle board, flake board, hardboard and plastic laminates.

Whatever the material, the end margins are cut away, or otherwise shaped, to form matching transverse recesses on opposite faces of the pieces. These recesses form cavities when placed in registration by end-abutting the pieces.

Where, as illustrated in FIGS. 1–3, the structural pieces 10, 12 are boards cut in the usual manner with the grain running lengthwise, the marginal portions are cut away to form recesses 14, 16, respectively. The cuts need not be deep, typical cuts having a depth of but from $\frac{1}{10}$ to $\frac{1}{8}$ inch. Normally the cuts should have a slope of from 8–20:1, preferably from 12–18:1. For best results, they should be slightly concave.

The ends of the structural members are squared, if necessary, and placed into abutting relationship. At least one splice plate is provided, which may comprise a thin sheet of plastic, metal, plastic laminate, fiberglass or other material. In the illustrated form of the invention, the splice plate comprises a flat piece of veneer or thin lumber 18 about 3 inches wide and arranged with its grain parallel to its surface and substantially aligned with the grain direction of structural pieces 10, 12.

The contact surface of the splice plate is coated with a layer 20 of suitable adhesive. The abutting end edges of structural pieces 10, 12 also may be coated with adhesive, although this usually is not necessary.

Any suitable adhesive may be employed, either cold press or thermosetting. For rapid manufacture on a plant scale, the phenol-, resorcinol-, urea-, or melamine-aldehyde resins; the casein glues; and the polyvinyl acetate adhesives may be used. They may be applied using conventional equipment such as sprays, or roll coaters.

After the end edges of pieces 10, 12 have been pressed into abutment, the adhesive-coated splice pieces 18, 24 are pressed and bent into registering recesses 14, 16, in the manner indicated in FIG. 2. For this purpose, press heads 26, 28 having an arcuate configuration conforming substantially to the contour of the recesses are employed. The edge grain direction of the splice pieces then necessarily will assume a corresponding arcuate configuration.

The assembly is pressed, hot or cold, according to the character of the glue, until the latter has set. Since the glue line is close to the surface, heat used to set thermosetting glues penetrates the splice pieces rapidly with the result that but short press times are required. This correspondingly increases the production rate where the method is applied on a commercial scale.

The spliced joint in its final form is illustrated in FIG. 3. It is evident from this view that the joint has substantial strength since grain slope adjacent the joint has been eliminated and the strong sides of the wood fibers have been glued together, rather than the cut ends. Also, the splice pieces need not be precisely cut since, in the final stage, the joined product may be passed through a sander or other suitable surfacing appliance for removing the projecting segments of the plates, indicated in dotted outline in FIG. 3.

In the form of the invention illustrated in FIGS. 4 and 5, structural wood pieces 10 and 12 are joined together in an analogous manner with the exception that splice pieces 30, 32 are cut to fit in arcuate segments rather than in flat pieces. This may be accomplished, for example, by cutting small billets of wood in special lathes having knives designed to cut out arcuate strips from the billet.

The arcuate splice pieces 30, 32 are coated with adhesive 34, 36 in any suitable manner and pressed into the recesses formed by abutting the end edges of pieces 10, 12. Thereupon the convexity of strips 30, 32 complements the concavity of the recesses formed by surfaces 14, 16 of the structural members so that a substantially precise fit is obtained. Hence it is not necessary to bend the splice pieces into the recesses. Furthermore, when they are placed in position, their surface and edge grain direction will align quite precisely with the grain direction of pieces 10, 12. This results in a product having greater strength. It also results in one which will sand more effectively to form a smooth, less perceptible joint. The final product, illustrated in FIG. 5, may be used in the indicated form or, preferably, surface sanded to remove the projecting segments of the splice pieces, indicated in dotted outline.

FIG. 6 illustrates the product obtained when plywood sheets are end-united by the presently described method. Thus two sheets 38, 40 may be provided with tapered end edges cut to a depth almost codimensional with the thickness of the surface veneers, i.e., substantially to the outer glue line. These are tightly abutted. Splice strips 42, 44, which may be flat, analogous to strips 18, 22, or arcuate, analogous to strips 30, 32, then are coated with glue, indicated at 46, 48, and pressed into the recesses. After the glue has set the assembly is removed from the press and sanded to produce a spliced product having the indicated appearance. As many lengths as desired may thus be joined end to end.

The method of the invention and the properties of the resulting product are illustrated in the following example:

Strips were cut from the sides of a 4 x 8 foot sheet of 5/8 inch, 5-ply, Douglas fir, sheathing grade plywood. The central portion of the strip was subdivided into specimens measuring 26½ inches long by 3½ inches wide, which served as controls.

The remaining central portion of the panel then was cut transversely and the margins adjacent the resulting end edges cut away to form arcuate recesses 1½ inches wide.

A splice strip of ⅛ inch Douglas fir veneer 3½ inches wide next was coated with urea formaldehyde plywood glue. After abutting the recessed end edges, the splice strips were placed into the recesses and hot pressed with an arcuate press head at 280° F. for 4 minutes.

Test specimens were cut from the central portion of the splice product in a position laterally aligned with that from which the unspliced control specimens were cut. All the specimens then were subjected to the standard ASTM static bending tests for small wood specimens, with results indicated in Table I.

*Table I*

| Specimen Number | Modulus of Rupture, lbs./sq. in. | Average Modulus of Rupture, lbs./sq. in. | Average Modulus of Rupture, Percent |
| --- | --- | --- | --- |
| 1[1] | 9,375 | | |
| 2[1] | 10,378 | | |
| 3[1] | 8,632 | 9,097 | 100 |
| 4[1] | 7,863 | | |
| 5[1] | 10,208 | | |
| 6[1] | 8,125 | | |
| 7 | 5,709 | | |
| 8 | 6,836 | 6,907 | 76 |
| 9 | 7,581 | | |
| 10 | 7,500 | | |

[1] Control.

The foregoing procedure was repeated, with the exception that the product was sanded after removal from the press. In this case the spliced specimens had an average rupture modulus of 94% of the control specimens.

Thus it will be apparent that by the present invention I have provided a method for making high-strength, spliced, lumber, plywood and other products without sacrificing any part of the length of the component units, as is necessary when splicing by means of conventional scarf joints. This is accomplished without the necessity of precisely matching two cut members. Still further, the method may be effectuated on a large commercial scale rapidly and without the use of elaborate equipment.

Having thus described my invention in preferred embodiments, I claim:

1. The spliced structural product comprising a pair of structural wood pieces arranged with their end edges abutting and their surface grains substantially aligned, and having their adjacent margins cut away on opposite sides of the pieces to form continuous shallow concave recesses including parts of both pieces, and wood splice pieces received one in each of the recesses with their face grain direction substantially aligned with the face grain direction of the structural pieces, and their edge grain direction conforming substantially to the arcuate contour of the concave recesses, the splice pieces overlying both structural pieces, the abutting surfaces of the splice pieces and structural pieces being glued together.

2. The structural product of claim 1 wherein the structural wood pieces are plywood pieces.

3. The method of making spliced structural products comprising forming shallow concave recesses in adjacent margins of a pair of wood structural pieces, arranging the pieces with their end edges abutting and their surface grains substantially aligned and the recesses registering with each other, bending a flat wood splice piece into the recesses with the surface grain direction of the splice piece substantially aligned with the surface grain of the structural pieces and the edge grain direction of the splice piece conforming substantially to the arcuate contour of the concave recess, and gluing the abutting surfaces of the splice piece and the wood structural pieces.

4. The method of claim 3 wherein the recesses and associated splice piece are provided on opposite sides of the structural pieces.

5. The method of making spliced structural products comprising forming shallow concave recesses in the adjacent margins of the opposite sides of a pair of wood structural pieces, arranging the pieces with their end edges abutting and their surface grains substantially aligned and the recesses registering with each other, seating a wood splice piece into each of the pair of recesses with the surface grain direction of the splice pieces substantially aligned with the surface grain of the structural pieces and the edge grain direction of the splice pieces conforming substantially to the arcuate contour of the concave recesses, and gluing the abutting surfaces of the splice pieces and the wood structural pieces.

References Cited in the file of this patent

UNITED STATES PATENTS

| | | |
|---|---|---|
| 618,738 | Sargeant | Jan. 31, 1899 |
| 1,802,829 | Pierce | Apr. 28, 1931 |
| 2,267,330 | Goss | Dec. 23, 1941 |
| 2,315,967 | Knowlton | Apr. 6, 1943 |
| 2,390,180 | Sahlberg | Dec. 4, 1945 |

FOREIGN PATENTS

| | | |
|---|---|---|
| 341,959 | Great Britain | Jan. 26, 1931 |